Patented Dec. 4, 1945

2,390,327

UNITED STATES PATENT OFFICE

2,390,327

ALLYL AND SUBSTITUTED ALLYL ACRYLATES

Chessie E. Rehberg, Philadelphia, and Charles H. Fisher, Abington, Pa., assignors to Claude R. Wickard, as Secretary of Agriculture of the United States of America, and his successors in office No Drawing. Application February 4, 1943, Serial No. 474,760

6 Claims. (Cl. 260—486)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

Our invention relates to allyl and substituted allyl acrylates and polymers and interpolymers thereof.

An object of our invention is the preparation of substituted allyl acrylates, such as beta-methylallyl acrylate, of reatitvely high molecular weight and low vapor pressure, hitherto unknown polymerizable compounds. A further object of our invention is the provision of a new and advantageous method of producing allyl acrylate, which was first prepared in 1873 by Caspary and Tollens (Ann. 167, 247–252 (1873)).

Polymers and interpolymers of allyl and substituted allyl acrylates have in a controllable degree the properties of fluidity, elasticity, plasticity, tensile strength, electrical resistance, resistance to water and organic liquids and gases, transparencey, and so forth, which are properties highly desirable in the group of substances commonly designated as plastics. Owing to the presence of two instead of one olefinic linkage, the allyl and substituted allyl acrylates have a characteristic not possessed by the simple alkyl acrylates, namely, the ability, when polymerized under suitable conditions, to form cross-linked, instead of linear, polymers and interpolymers of increased hardness and decreased solubility (M. A. Pollack, I. E. Muskat and F. Strain, U. S. 2,273,- 891, February 24, 1942). Hence, the allyl and substituted allyl acrylates are particularly valuable in that they can be used with other unsaturated monomers to prepare interpolymers of any desired degree of cross-linkage, hardness and insolubility.

Unsaturated hydrocarbons can be produced by the elimination of acetic acid from the acetylated alcohol. For example, 2,4-dimethylpentene-2 is produced by the pyrolysis of acetylated 2,4-dimethylpentanol-3 (Van Pelt and Wibaut, Rec. trav. chim. 57, 1055 (1938), 60, 55–64 (1941); Stevens and Richmond. J. Am. Chem. Soc. 63, 3132–6 (1941). Also, unsaturated acids can be formed by the pyrolysis of the acetylated derivatives of poly-carboxylic acids. For example, aconitic ester is produced by pyrolysis of the acetylated citric ester, and maleic anhydride is produced by the pyrolysis of acetylated malic anhydride. (Hurd, "Pyrolysis of Carbon Compounds," A. C. S. Monograph 50, New York, Reinhold Publishing Corporation, 1929.) Further, the acetylated methyl ester of lactic acid on pyrolysis produces methyl acrylate, but the ethyl ester and higher alkyl esters tend to undergo pyrolytic decomposition with the formation of an unsaturated hydrocarbon and the corresponding acid (Burns, Jones and Ritchie, J. Chem. Soc. 1935, 400–6 714–7; U. S. 2,183,357, December 12, 1939; Smith, Fisher, Ratchford and Fein, Ind. Eng. Chem. 34, 473–479 (1942); Claborn, U. S. 2,222,- 363, November 19, 1940; U. S. 2,229,997, January 28, 1941). This tendency increases as the molecular weight of alkyl group increases. Thus it has not been possible hitherto to produce satisfactorily alkyl acrylates of relatively high molecular weights and high boiling points by this process.

We have found that the presence of an olefinic linkage between the beta and gamma carbon atoms of the alcohol group $$CH_3COOCH(CH_3)COO.CH_2.CH:CH_2$$

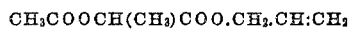

decreases the undesirable side reactions encountered in pyrolysis of the alkyl alpha-acetoxypropionates of higher molecular weight heretofore examined, and that, owing to the characteristics of the allyl and substituted allyl radicals and their esters, their alpha-acetoxypropionates can be converted readily and in good yields into the allyl and substituted allyl acrylates as shown below:

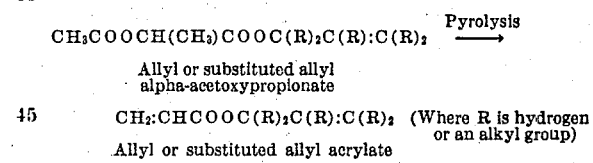

Transformation of the allyl or substituted allyl alpha-acetoxypropionates into the corresponding acrylates is effected conveniently by passing vapors of the acetoxypropionate through a pyrolysis tube, usually packed in the heated zone with quartz chips or similar contact material maintained at 400° to 600° C. Below 400° C. the conversion is slow, whereas at temperatures above 600° C. excessive decomposition into undesired by-products occurs.

Although we illustrate our invention with the acetyl derivatives of allyl and substituted allyl lactates, other similar derivatives, such as the propionyl and benzoyl derivatives (propionates, benzoates), can also be used.

Our invention comprises the following technique. The substances formed as intermediate products in Step 1 and Step 2 below are the subject of other patent applications, filed concurrently herewith.

Step 1.—The conversion of lactic acid and allyl or substituted allyl alcohols into allyl or substituted allyl lactates by esterification, in accordance with the reaction:

C(R)₂:C(R)C(R)₂OH+CH₃CHOH.COOH→
    C(R)₂:C(R)C(R)₂OCOCHOHCH₃+H₂O (Where R is hydrogen or an alkyl group)

Step 2.—The conversion of allyl or substituted allyl lactates into allyl or substituted allyl alpha-acetoxypropionates by esterification of the alpha-alcoholic hydroxyl group of the lactate radical by means of an acetylating agent, such as acetic anhydride or ketene. The reaction when ketene is used as the acetylating agent is:

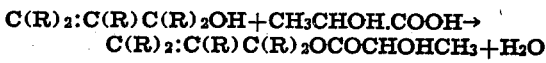

(Where R is hydrogen or an alkyl group)

Step 3.—The conversion of allyl or substituted allyl alpha-acetoxypropionate into allyl or substituted allyl acrylate and acetic acid by means of pyrolytic decomposition, in accordance with the reaction:

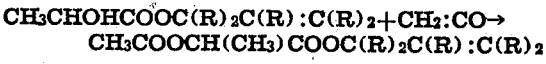

(Where R is hydrogen or an alkyl group)

Step 4.—The conversion of allyl or substituted allyl acrylate into polymers and interpolymers of more or less complexity and magnitude by means of heat or other aids to polymerization.

The following examples describe in detail a preferred procedure for making the acrylates mentioned above and their polymers.

*Example 1*

Step 1.—Allyl lactate is prepared by esterification of lactic acid and allyl alcohol.

Examples of the preparation of allyl lactate are:

(a) Two moles (180.2 g.) of essentially 100 per cent lactic acid, 2.2 moles (127.8 g.) of allyl alcohol, 200 cc. of benzene and 3 cc. of concentrated sulfuric acid were refluxed 3 hours while water was continuously removed as formed by use of a trap. Benzene and unreacted allyl alcohol were removed by distillation under about 20 mm. pressure, after which allyl lactate was distilled under 1 mm. pressure, its boiling point under this pressure being 27°–29° C. The yield was 88 g., or 34 percent of the theoretical. More of the ester, allyl lactate, was obtained by adding allyl alcohol, benzene and acid catalyst to the distillation residue, refluxing and then distilling the reaction mixture as before.

(b) Two moles (180.2 g.) of essentially 100 percent lactic acid was dehydrated by refluxing with benzene, a trap being used to remove water. After complete removal of water (34 cc.), 6 moles of allyl alcohol was added and the mixture was refluxed several hours. The benzene and excess alcohol were then removed by fractional distillation, the final stage being carried out under a pressure of about 20 mm. The allyl lactate was then distilled at 60° C. under 7 mm. pressure, 45 g. being obtained. The recovered alcohol was returned to the reaction vessel containing the distillation residue, 1–2 g. of p-toluenesulfonic acid was added, and the mixture again refluxed for several hours. Upon distillation, 159 g. of allyl lactate was obtained. The total yield was thus 204 g., or 78 percent of the theoretical. The residue (presumably polylactic acid) could doubtless be used again or added to a new batch of material, thus eventually converting virtually all of it into ester.

Prepared by any method, allyl lactate is a clear, colorless, mobile liquid at room temperature, with a mild and not unpleasant odor; boiling at 60° C. under 7 mm. of mercury pressure, 79° C. under 25 mm., and 175.5° under 754 mm. pressure; having a specific gravity of 1.0452 at 20° C.; and having a refractive index for the yellow sodium line of 1.4369 at 20° C.

Step 2.—Using any of the common acetylating agents, such as ketene or acetic anhydride, allyl lactate is converted into allyl alpha-acetoxypropionate, as follows: To 1.5 moles (195 g.) of allyl lactate there was slowly added, with stirring, 1.65 moles (168 g.), 10 percent excess, of acetic anhydride. The mixture was warmed to 50°–60° C. to start the reaction, after which cooling was used to keep the temperature below 100°–110° C. After standing an hour the mixture was fractionated under a pressure of 7 mm., the product being collected at 80°–81° C. The yield was 230 g., or 89 percent of the theoretical.

Allyl alpha-acetoxypropionate is a clear, colorless, mobile liquid of slight, though pleasant odor; having a boiling point of 81° C. under 7 mm.; having a specific gravity of 1.0544 at 20° C.; and having a refractive index for the yellow sodium line of 1.4270 at 20° C.

Step 3.—Allyl alpha-acetoxypropionate (134.8 g.) was allowed to run at a rate of 60 drops per minute (contact time approximately 5.9 seconds) into a Pyrex tube 30 cm. long and 2.5 cm. outside diameter, and filled with Pyrex fragments. The tube was heated by an electric furnace; the temperature of the furnace was maintained at 546° C. and recorded automatically. The glass pyrolysis tube was provided at the top with a dropping funnel and pressure equalizer for adding the liquid reagent at constant rate. The apparatus was swept out with nitrogen before the reaction was started and a slow current of nitrogen was passed through continuously during the course of the reaction. A small amount of hydroquinone was added to the condensate to prevent premature polymerization. The condensate (111.2 g.) was fractionally distilled under reduced pressure; 60 cc. (mainly acetic acid and allyl arcylate) were collected at 40° to 60° C. under 50 mm. pressure. Some of the starting material (39 g. of allyl alpha-acetoxypropionate) was recovered by distillation as a high-boiling fraction. Acetic acid was removed from the 60 cc. fraction containing acetic acid and allyl acrylate by washing with water and sodium carbonate. Redistillation, after drying with anhydrous sodium sulfate and adding 0.2 g. of hydroquinone, yielded 26.6 g. of allyl acrylate boiling at 45° to 50° C. under 40 mm. pressure. The yield of allyl acrylate based on the 96 g. of starting material destroyed was 42.6 percent of the theoretical.

Allyl acrylate is a clear, colorless, mobile liquid at 25° C., having a boiling point of 122° C. at atmospheric pressure, a specific gravity of 0.9410 at 20° C. and a refractive index for the yellow sodium line of 1.4295 at 20° C.

Step 4.—When it is desired to polymerize allyl acrylate, the ester is first separated from the hydroquinone or other inhibitor, conveniently by distillation under reduced pressure. The ester is then polymerized in a vessel or mold of the shape desired. If it is desired to prepare the polymer in the interstices of fabrics or on the surface of paper or leather, various proportions of ethyl acetate or other suitable low-boiling diluent can be added to the ester partially polymerized, and the mixture applied to the fabric or other material in a thin layer. The solvent is allowed to evaporate and the resulting film is heated at moderate temperatures for several hours to remove traces of solvent and to complete the polymerization.

High-boiling liquids miscible with the acrylate, such as diamylphthalate, may be added as plasticizers or softening agents. Miscible polymerizable substances, such as other acrylates or methylacrylates, may be mixed with allyl acrylate and the mixtures subjected to polymerization influences. Polymerization catalysts, such as benzoyl peroxide, may be used instead of heat to expedite polymerization.

Allyl acrylate when heated alone yields a relatively hard, insoluble and infusible resin. Polymerization of a solution consisting of 5 per cent allyl acrylate and 95 percent acrylate yielded a polymer that was harder and tougher than the resin obtained by polymerizing methyl acrylate alone.

*Example 2*

Step 1.—Beta-methylallyl lactate is prepared by esterification of lactic acid with beta-methylallyl alcohol.

Examples of the preparation of beta-methylallyl lactate are:

(a) Using essentially the same procedure as in Example 1, Step 1 (a), except that the use of sulfuric acid as a catalyst was omitted, there was obtained from 3 moles (270 g.) of lactic acid and 3.3 moles (238 g.) of beta-methylallyl alcohol 143 g. of ester, this being 33 percent of the theoretical amount. By repeated treatment of the polylactic acid residue with more of the alcohol, additional yields of ester were obtained, thus raising the total yield to about 65 percent of the theoretical.

(b) Five moles (450 g.) of lactic acid and 15 moles (1080 g.) of beta-methylallyl alcohol were refluxed under a fractionating column having a water trap of the Betz-Holden type at its top until no more water could be removed. Fractionation of the product then gave 366 g. of ester boiling at 88°–94° C. under 26 mm. of mercury pressure, or a yield of 51 percent of the theoretical.

Prepared by any method, beta-methylallyl lactate is a clear, colorless, mobile liquid at room temperature, with mild odor; having boiling points of 69° C. under 8 mm. and 78° C. under 11 mm. of pressure;. having a specific gravity of 1.0181 at 20° C.; and having a refractive index for the yellow sodium line of 1.4389 at 20° C.

Step 2.—Using a common acetylating agent such as ketene or acetic anhydride, beta-methylallyl lactate is converted almost quantitatively into beta-methylallyl alpha-acetoxypropionate. The acetylation is carried out conveniently as follows: Using essentially the procedure described in Example 1, Step 2, except that 1–2 cc. of phosphoric acid was used as a catalyst and the temperature was maintained at 60°–80° C., there was obtained from 1.5 moles of beta-methylallyl lactate and 1.8 moles of acetic anhydride a yield of 260 g. of beta-methylallyl alpha-acetoxypropionate, this being 93 percent of the theoretical yield.

Beta-methylallyl alpha-acetoxypropionate is a clear, colorless, mobile liquid, with a slight, pleasant odor; having boiling points at 76° C. under 3 mm., 87° under 5 mm. and 95° C. under 10 mm. pressure; having a specific gravity of 1.0330 at 20° C.; and having a refractive index for the yellow sodium line of 1.4314 at 20° C.

Step 3.—Using the equipment and procedure described in Step 3 of Example 1, 158.4 g. of beta-methylallyl alpha-acetoxypropionate was pyrolyzed at 516° C. at the rate of 30 drops per minute (contact time approximately 8.5 seconds). The amount of liquid products obtained was 137.8 g. By fractionation and purification as in Step 3 of Example 1, 29 g. of beta-methylallyl acrylate boiling at 70°–74° C. under 50 mm. pressure was obtained. Unchanged starting material (56.4 g.) was recovered during the distillation at a higher temperature. The yield of beta-methylallyl acrylate on the basis of the starting material destroyed was 41 percent of the theoretical.

Beta-methylallyl acrylate is a clear, colorless, mobile liquid at 25° C., having a boiling point of substantially 70°–74° C. at 50 mm. pressure, a specific gravity of 0.9275 and a refractive index for the yellow sodium line of 1.4385 at 20° C.

Step 4.—Using substantially the procedures outlined in Step 4 of Example 1, beta-methylallyl acrylate can be polymerized to various degrees to obtain useful polymers ranging widely in properties, such as hardness, plasticity, solubility, fusibility, and so forth. Moreover, beta-methylallyl acrylate can be interpolymerized with many unsaturated compounds, such as acrylic esters, methacrylic esters, acrylonitrile, crotonic acid, crotonic esters, maleic esters, vinyl chloride, vinyl acetate and styrene, to yield various interpolymers of utility. The properties of these interpolymers can be controlled over a wide range by varying the proportions of the monomers used, or by controlling the extent of the polymerization of a given mixture of beta-methylallyl acrylate and unsaturated compound, or by a combination of the two.

As an example, polymerization of a mixture of 5 percent beta-methylallyl acrylate and 95 percent methyl acrylate yielded a polymer that was noticeably harder and less soluble than the polymer prepared from methyl acrylate alone.

Having thus described our invention, we claim:

1. The process of manufacturing allyl acrylate which comprises reacting allyl alcohol with lactic acid, thereby forming allyl lactate and water, separating the allyl lactate from the water, reacting the allyl lactate with an acetylating agent to form allyl alpha-acetoxypropionate, pyrolyzing the allyl alpha-acetoxypropionates at a temperature of about 400° to 600° C., whereby allyl acrylate is formed, and then recovering the allyl acrylate.

2. The process of preparing allyl acrylate which comprises pyrolyzing allyl alpha-acetoxypropionate at a temperature of about 400° to 600° C.

3. The process of preparing a compound selected from the group consisting of allyl acrylate and beta-methylallyl acrylate which comprises pyrolyzing respectively a member selected from the group consisting of allyl alpha-acetoxypropionate and beta-methylallyl alpha-acetoxypropionate at a temperature of about 400° to 600° C.

4. The process of manufacturing a compound selected from the group consisting of allyl acrylate and beta-methylallyl acrylate which comprises reacting respectively an alcohol selected from the group consisting of allyl alcohol and beta-methylallyl alcohol with lactic acid, thereby forming the corresponding lactate and water, separating the lactate from the water, reacting the lactate with an acetylating agent to form the corresponding alpha-acetoxypropionate, pyrolyzing the resulting alpha-acetoxypropionate at a temperature of about 400° to 600° C., whereby the desired acrylate is formed, and then recovering the acrylate.

5. The process of manufacturing beta-methylallyl acrylate which comprises reacting beta-methylallyl alcohol with lactic acid, thereby forming beta-methylallyl lactate and water, separating the beta-methylallyl lactate from the water, reacting the beta-methylallyl lactate with an acetylating agent to form beta-methylallyl alpha-acetoxypropionate, pyrolyzing the beta-methylallyl alpha-acetoxypropionate at a temperature of about 400° to 600° C., whereby beta-methylallyl acrylate is formed, and then recovering the beta-methylallyl acrylate.

6. The process of preparing beta-methylallyl acrylate which comprises pyrolyzing beta-methylallyl alpha-acetoxypropionate at a temperature of about 400° to 600° C.

CHESSIE E. REHBERG.
CHARLES H. FISHER.